March 12, 1957 — J. SMISKO — 2,784,637
NUT HAVING ROTARY PAWL DISENGAGING SLEEVE
Filed Dec. 7, 1951
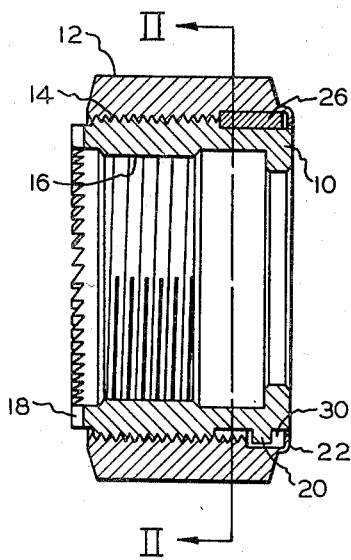
FIG. I.
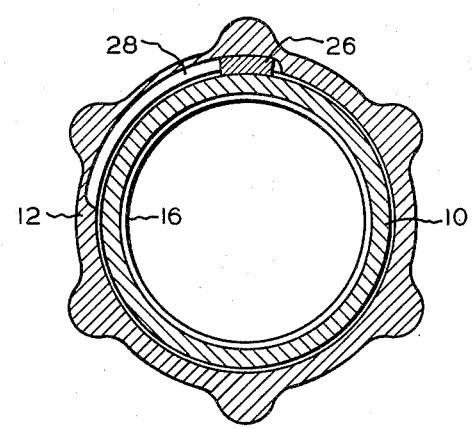
FIG. II.
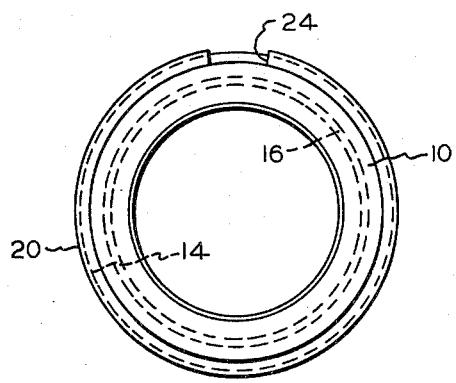
FIG. III.
INVENTOR
JOHN SMISKO
BY Townsend F. Beaman
ATTORNEY United States Patent Office 2,784,637
Patented Mar. 12, 1957

2,784,637

NUT HAVING ROTARY PAWL DISENGAGING SLEEVE

John Smisko, Jackson, Mich., assignor to Aeroquip Corporation, Jackson, Mich., a corporation of Michigan Application December 7, 1951, Serial No. 260,521

1 Claim. (Cl. 85—32)

This invention relates to two part union nut assemblies having the same general construction and function as disclosed in United States Patent No. 2,489,919 granted to H. H. Merriman on November 29, 1949, and assigned to Aeroquip Corporation.

The prior patent discloses a union nut assembly composed of an inner nut proper having internal screw-threading and an end edge with axially extending locking teeth and an outer nut actuating sleeve which substantially encloses the nut and has a quick-action screw threaded connection with the nut but of opposite direction to the threading on the nut interior, which threading on the nut interior serves for the screwing of the nut onto a required receiving part, as for example a coupling body part. The nut and the encircling actuator sleeve have co-operable radial shoulder stops which limit the relative axial movement which takes place between the nut and the sleeve at the commencement of an unscrewing or screwing-up operation due to the opposite hand threaded connection above mentioned and which, at the commencement of a screw-up operation, causes the axial locking teeth to become exposed beyond one end of the sleeve and, at the commencement of an unscrewing operation, causes the axial locking teeth to be confined within the sleeve. The axial extent of such radial shoulder stops is such as to permit the required relative axial movement to take place between the sleeve and the nut to expose or confine said locking teeth, whereafter the nut and sleeve become locked together for unitary rotation for the remainder of the unscrewing or screwing-up operation.

While reference has been made to axial locking teeth it is to be understood that both in the case of the prior patent and with the present invention the provision of such axial teeth is not essential. When provided, as in the case of the prior patent, they are employed to automatically lock and unlock with respect to relatively stationary teeth, but the relative axial motion referred to can be utilized for other purposes than to engage and disengage locking teeth.

In connection with the nut structure specifically disclosed in the prior patent, while it was always intended that the outer sleeve should not be handled as though it were a nut itself but only as an actuator for the enclosed nut proper, for which reason it was sought to deprive the sleeve of the appearance of a nut so that it would never be subjected to actuation by a wrench or spanner to produce excessive tightening but would always be left free to be turned manually, it has been found in practice and in continued use of the union nuts according to the prior patent that some operatives, in ignorance of or disregard to the true purport of the outer sleeve, and noticing the relative looseness thereof or freedom to rotate, have adapted tools to actuate the sleeve and tighten it as though it were a nut. It is to be noted in the case of the prior patent that both the interior nut threading and the exterior nut threading are of conventional screw formation, whereby it will be self understood that if the sleeve is tightened too severely upon the nut a wedge action would be created by the angular relationship existing between the abutting shoulder stops on the sleeve and nut parts and the helix angle of the threads connecting the sleeve and nut and that this would cause the sleeve to become locked or "frozen" upon the nut and thus destroy the automatic locking and unlocking action which it was intended should be performed in the actuation of the sleeve and nut assembly. This has given rise to difficulty and objection, which it is the purpose of the present invention to overcome and eliminate.

It is an object of the invention therefore to provide a two part union nut assembly of the kind above described in which provision is made whereby the outer sleeve is precluded from being actuated to cause the sleeve and the nut enclosed thereby to become locked or frozen together.

It is a further object of the invention to provide a sleeve and nut assembly of the kind above described in which an improved connection is provided between the nut and the outer sleeve such that it becomes impossible to lock or freeze the sleeve upon the nut.

These and further objects and advantages of the invention residing in the construction, arrangement and combination of parts will become more apparent and be appreciated from a consideration of the following detail description of one practical form of the invention by way of example, with reference to the accompanying drawings and from the appended claims.

In the drawings:

Fig. I is a longitudinal sectional view through one form of union nut in accordance with the invention, showing the inner nut part with its one end projected beyond the corresponding end of the outer nut actuator sleeve, Fig. II is a section on the line II—II of Fig. I, and Fig. III is an end view of the inner nut part looking on the right-hand end as seen in Fig. I.

Referring to the drawings, the union nut shown therein comprises an inner nut part 10 and an outer sleeve part 12 mounted about the nut part in substantial enclosing relationship thereto and connected with the nut part by left-hand screw-threading 14, the nut having internal right-hand screw-threading 16 for the screwing of the nut and sleeve assembly upon a receiving part therefor.

The overall length of the nut 10 exceeds that of the sleeve 12 by the extent of the end nut portion 18 shown in Fig. I projected beyond one end of the sleeve. This nut end portion 18 may be formed by a series of axial ratchet teeth as and for the purpose described in the said prior Patent No. 2,489,919.

At their ends remote from the said end portion 18 the nut 10 is formed with an outwardly directed radial flange 20, inwardly situated from the actual end of the nut, whereas the sleeve is formed at such end with an inwardly directed radial flange 22.

In order to eliminate the possibility of the actuator sleeve 12 being forcibly tightened and give rise to a wedging or freezing of the sleeve upon the nut, provision is made in the present nut and sleeve construction to prevent the flanges 20 and 22 from contacting one another in either of the extreme positions of projection or retraction of the nut relatively to the sleeve. If such contact is allowed to take place this, together with the angular relationship then set up between the abutting flanges and the adjacent end of the sleeve teeth, will if the sleeve is unduly tightened or actuated cause the sleeve to freeze upon the nut. Such possibility is precluded in the present construction by the nut being formed around its outer periphery with an axial slot 24 (Fig. III) in which a key 26 (Figs. I and II) is located and engaged at its inner end in an arcuate slot 28 formed on the interior of the sleeve. With the sleeve and nut in either of their extreme axial positions (that is, with the nut fully projected as seen in Fig. I or fully retracted) the initial rotation of the sleeve will be accompanied by relative rotation of the sleeve upon the nut and simultaneous axial displacement of the nut, due to the threaded connection at 14. This motion will also be accompanied by arcuate movement of the key 26 within the arcuate slot 28 from one end of the slot to the opposite end. Upon the key reaching the opposite end of the slot 28, and rotation of the sleeve 12 being continued, further relative rotation of the sleeve and nut is precluded and both must rotate as a unit, with the nut threading 16 then becoming effective.

The arcuate extent of the slot 28 is so chosen in relation to the axial spacing of the flanges 20 and 22 that with the key 26 at either end of the slot 28 there will always be a space, as indicated at 30 in Fig. I, between the flanges 20 and 22. Consequently it becomes impossible to freeze the sleeve upon the nut.

The key 26 has an axial sliding fit in the slot 24 and is retained in position by the presence of the flange 22.

Having thus described my invention and the manner in which it can be carried into practice, without however limiting the invention to the precise details of construction therein involved, what I claim as novel and wish to secure by Letters Patent is as follows:

A nut structure comprising in combination, inner and outer hollow body parts, said parts comprising an inner nut part having internal and external screw threads in opposite direction and an outer sleeve part substantially enclosing said nut part so as to constitute a rotary actuator therefor, said outer sleeve part having a threaded bore having screw threaded engagement with said external screw threading of said nut part, annular flanges on said nut and sleeve part providing axially opposed radial surfaces, said nut part having an axial slot defined in its annular flange and said sleeve having an arcuate slot defined in its bore in opposed radial relation to the flange of said nut part, and a key in said axial slot and engaged in said arcuate slot, said key moving in said arcuate slot upon relative rotation of said sleeve and nut parts and determining the permitted relative rotational movement between said sleeve and nut parts, said permitted rotational movement being such that at either limit of travel of the key in said arcuate slot the said axially opposed radial surfaces are maintained in spaced relationship, and said sleeve flange projecting radially across said axial slot to retain said key in said axial slot.

References Cited in the file of this patent
UNITED STATES PATENTS

| | | |
|---|---|---|
| 798,576 | Exley | Aug. 29, 1905 |
| 1,646,805 | Bell | Oct. 25, 1927 |
| 2,489,919 | Merriman | Nov. 29, 1949 |